United States Patent [19]

Kleeblatt

[11] Patent Number: 4,662,335
[45] Date of Patent: May 5, 1987

[54] AUTOMATIC CONTROL OF CONTAMINANT REDUCTION

[75] Inventor: Herbert Kleeblatt, Germering, Fed. Rep. of Germany

[73] Assignee: M.A.N. Maschinenfabrik Augsburg-Nurnberg Aktiengesellschaft, Munich, Fed. Rep. of Germany

[21] Appl. No.: 795,074

[22] Filed: Nov. 4, 1985

[30] Foreign Application Priority Data

Nov. 13, 1984 [DE] Fed. Rep. of Germany ....... 3441390

[51] Int. Cl.$^4$ ................................................. F02B 3/00
[52] U.S. Cl. ...................................... 123/440; 123/489
[58] Field of Search ................................. 123/440, 489

[56] References Cited

U.S. PATENT DOCUMENTS

| | | | |
|---|---|---|---|
| 4,377,143 | 3/1983 | Hamburg | 123/440 |
| 4,401,086 | 8/1983 | Miyagi | 123/440 |
| 4,434,764 | 3/1984 | Hasegawa | 123/440 |
| 4,445,481 | 5/1984 | Aoki | 123/440 |

*Primary Examiner*—Ronald B. Cox
*Attorney, Agent, or Firm*—Alan H. Levine

[57] ABSTRACT

In an automatic control method for reduction in the level of contaminants emitted by a gas engine, the automatic control process is orientated in accordance with the reference point at which lambda is equal to unity and enriches the mixture after detecting this point by a certain step. Subsequently the instantaneous probe potential is measured and used by an automatic control circuit as a set point, which so affects the actuator for setting the air ratio that the probe potential is kept constant at this set point. The automatic control system in keeping with the invention reacts immediately in response to a disturbance and does not have to wait until a renewed search for the reference point takes place.

6 Claims, 2 Drawing Figures

AUTOMATIC CONTROL OF CONTAMINANT REDUCTION

BACKGROUND OF THE INVENTION

The invention relates to a method for the automatic control of contaminant reduction as applied to gas engines using a sensor in the form of lambda probe adapted to produce a probe potential as an input quantity, the air/fuel ratio lambda being basically able to be set to a value of less than unity and being able to be kept constant as far as possible over the full load range of the engine, a servo member being actuated, more especially at regular intervals until the lambda probe detects an air/fuel ratio of unity and the mixture is enriched again by one of a series of equal steps until the desired air/fuel ratio lambda has been set.

In this method, assumed to be known, of catalytic contaminant reduction in which the air/fuel ratio is able to be set to a value less than unity and as far as possible kept constant over the full load range of the gas engine, a lambda probe is used whose potential is only defined exactly for the stoichiometric point (at which lambda is then equal to 1.0). At all other points, including the operating point of lambda less than unity relevant in the present case, there is no exact correlation between the air/fuel ratio and the probe potential. A conventional automatic control system using the probe voltage as an input quantity would no longer be satisfactory.

This shortcoming may however be overcome by an automatic control system, which is orientated at certain times with respect to the reference point at which lambda is equal to unity, this being done by operating the servo actuator at regular intervals in time until the lambda probe detects an air/fuel ratio of 1. Thereafter the mixture is enriched by a constant adjustment step again to attain the desired air/fuel ratio independently of the instantaneous probe potential during operation. The actuator for varying the air/fuel ratio is then latched in its new setting until the reference point is again to be sought, whereafter the mixture is enriched in equal steps. Such a method has been previously proposed, but it suffers from the disadvantage that during the intervals between seeking the reference point it is not possible to carry out regulation to overcome disturbances affecting the system.

SHORT OUTLINE OF THE INVENTION

One object of the present invention is to devise an automatic control method for reducing contaminants produced by gas engines of the initially specified sort, which represents an improvement on the methods proposed hitherto.

A further aim of the invention is to create such a method which more particularly simplifies regulation to overcome disturbance.

The automatic control method of the invention is orientated or guided also at the reference point at which lambda is equal to unity and enriches the mixture after the detection of this point by a certain step. Then the instantaneous probe potential is stored and used by an automatic control circuit as a set point, which so affects the actuator for setting the air/fuel ratio that the probe potential is kept constant at this set point. This automatic control reacts immediately to any disturbance and does not have to wait until the time comes to seek the reference point again. In this respect advantage is taken of the fact that the relation between the air/fuel ratio and the probe potential only changes comparatively slowly.

Further advantageous forms of the invention are defined in the claims.

A detailed account of one working example of the invention will now be given with reference to the accompanying drawing.

LIST OF THE SEVERAL VIEWS OF THE FIGURES

DETAILED ACCOUNT OF WORKING EMBODIMENT OF THE INVENTION

Figure 1:
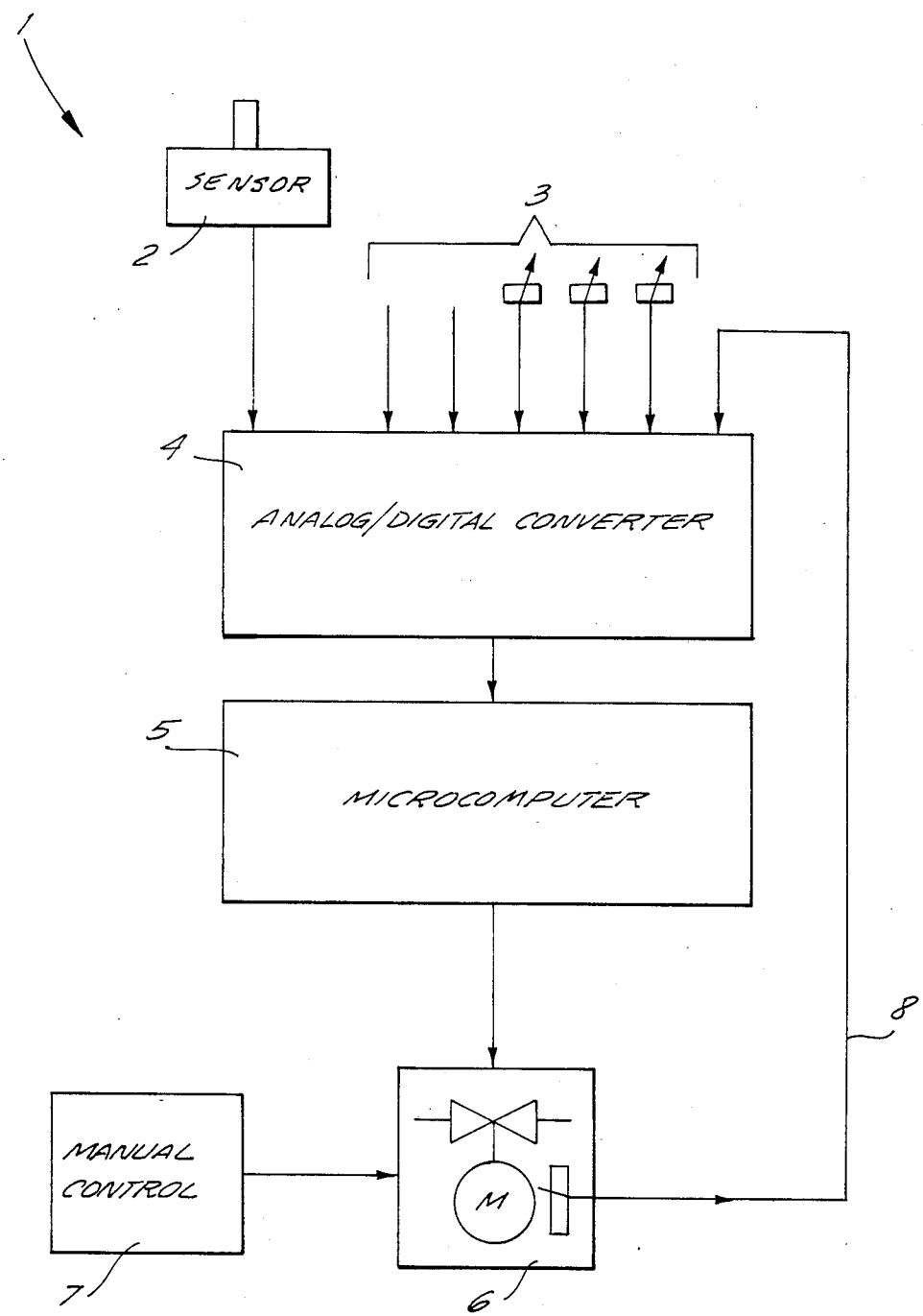
FIG. 1 represents a diagram of an automatic control circuit in keeping with the present invention.

The automatic control circuit 1 according to FIG. 1 has as its chief components a sensor 2, an analog/digital converter 4 with a plurality of subsidiary inputs 3, a microcomputer 5, an actuator 6 including a motor M for adjustment of the mixture and having a feedback potentiometer downstream therefrom and connected via a line 8 with one input 3 of the converter 4, wherein feedback of the valve setting takes place, and optionally a manual setting member 7 for manual operation of the actuator 6.

The probe potential from the sensor 2 is fed via the analog/digital converter 4 to the microcomputer 5.

Figure 2:
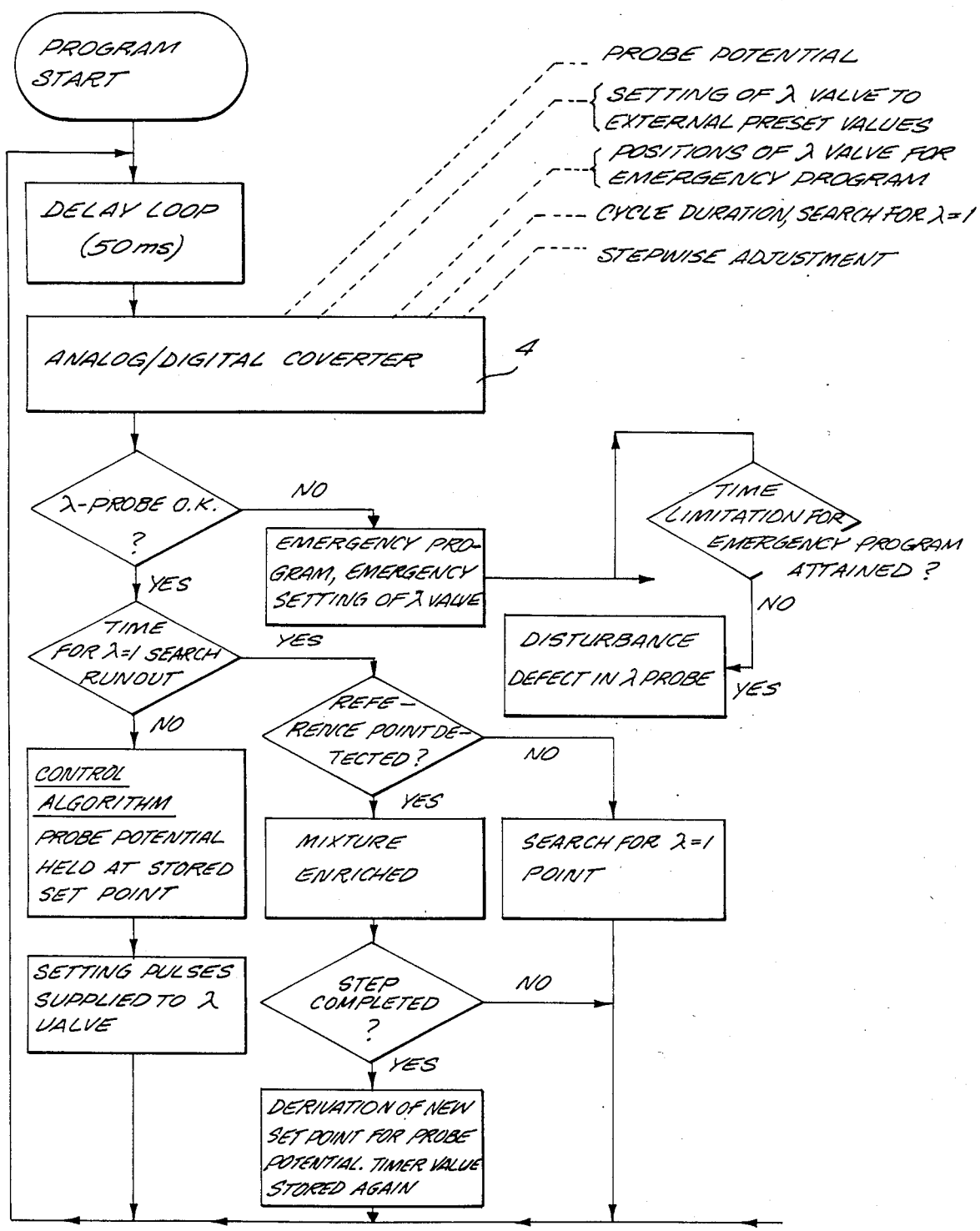
FIG. 2 is a logic diagram or flow chart of the form of the invention illustrated in FIG. 1.

The signal processing and automatic control takes place in accordance with a suitable program, whose logic flow chart may be seen from FIG. 2.

The valve, driven by the electric motor, of the actuator 6 may be moved in the opening and closing directions directly from the microcomputer 5 at the TTL signal level. A valve in accord with the working example is provided with a feedback potentiometer. The information for the valve setting goes via the analog/-digital converter 4 to the micromputer 5 and may then be processed there for an "emergency program".

Furthermore to provide a possibility of manual adjustment it is possible to use the manual control member 7.

It will be seen from FIG. 1 that the converter 4 possesses seven inputs 3 so that useful parameters may be changed using simple potentiometers. And it is furthermore possible if desired for subsidiary input quantities to be taken into account in the automatic control operation, as for example in addition to the probe potential and the setting of the lambda valve, external preset data such as the position of the lambda valve for an emergency program, the duration of a cycle for seeking a lambda at unity value or the size of the setting step (see FIG. 2).

I claim:

1. A method of controlling the air/fuel ratio in a gas engine, comprising the steps of:
    sensing the air/fuel ratio and producing a signal in response thereto, the signal being a pre-known value when stoichiometry is sensed,
    adjusting the air/fuel mixture until a signal of the pre-known value is sensed indicating that stoichiometry is present,
    then enriching the air/fuel mixture by a predetermined amount, to create a desired air/fuel ratio richer than the stoichiometric point, and storing the signal produced by that enriched mixture, the stored signal establishing a desired set point corresponding to the desired air/fuel ratio, thereafter continuously sensing the air/fuel ratio and producing signals in response thereto, and adjusting the air/fuel mixture in response to those signals so as to maintain those signals as close as possible to the set point.

2. A method as defined in claim 1 wherein the air/fuel ratio is sensed by a lambda probe.

3. A method as defined in claim 1, wherein the signals are fed to a microcomputer via an analog/digital converter.

4. A method as defined in claim 3 wherein the analog/digital converter has a plurality of inputs.

5. A method as defined in claim 3 wherein the microcomputer operates a valve for controlling the flow of fuel to the engine.

6. A method as defined in claim 5 wherein the valve is also manually operable.

* * * * *